Sept. 11, 1956  H. W. HART  2,762,495
FLEXIBLE CONVEYORS IN TROUGHS AND TUBES
Filed April 22, 1952
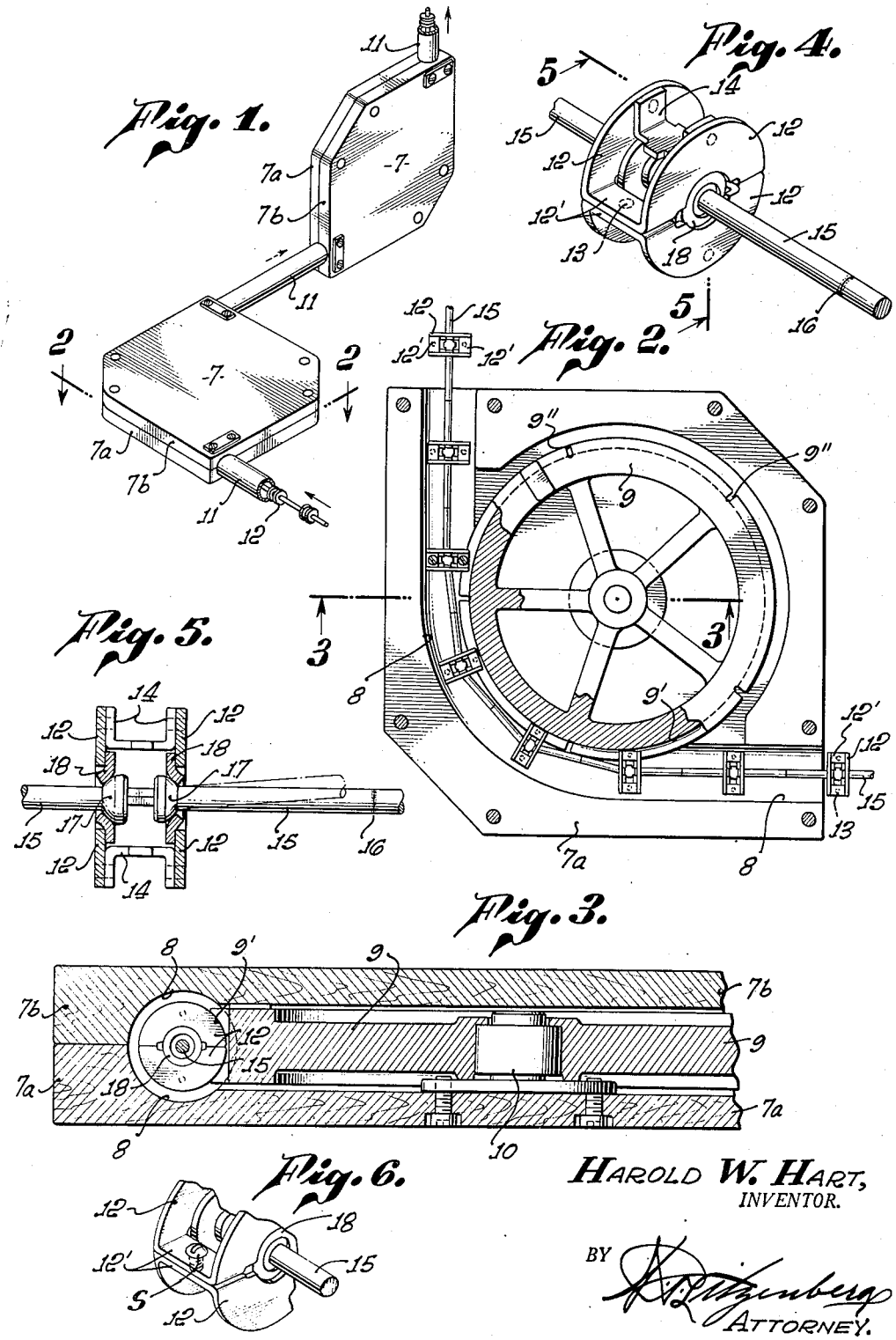
HAROLD W. HART,
INVENTOR.
BY
ATTORNEY.

United States Patent Office 2,762,495
Patented Sept. 11, 1956

2,762,495
FLEXIBLE CONVEYORS IN TROUGHS AND TUBES

Harold W. Hart, Glendale, Calif.

Application April 22, 1952, Serial No. 283,573

3 Claims. (Cl. 198—176)

This invention relates to flexible conveyors in troughs and tubes for conveying loose matter or materials, such as feed for poultry and other animals, through said troughs and tubes to various feeding pens and places, and also from one floor or level to another floor or level, and which flexible conveyor will and does move around an enclosed corner or turning pulley or sheave, whether in a horizontal plane or a vertical plane, whereby to move said loose matter with it through a circuitous course of travel.

Among the salient objects of the invention are:

To provide a new and improved flexible conveyor capable of moving through a trough or tube and around turns therein for the purpose of moving or pushing loose matter along with it in small amounts at each joint or coupling member, said joint or coupling member being designed to push or carry said loose matter along with it without crushing or packing it in clots;

To provide a construction of conveyor in which the joint or coupling member between the connecting rods or links is preferably made of two spaced disc-like elements, secured together at a short space apart in parallel relationship and in axial alinement with each other, whereby the edges of said spaced disc-like elements will cut down into the loose matter and move it along with them as they move in the trough or tube;

To provide a conveyor coupling made of two spaced disc-like elements joined rigidly together to form said conveyor coupling member, and to the opposite sides of which two conveyor connecting rods or link members are pivotally connected, whereby to make possible the free movement of said conveyor through a trough or tube and around turns or loops in the course of travel;

To provide a construction of flexible conveyor of the character referred to which makes possible and economical mass production thereof, and which would otherwise be too expensive for use in automatic poultry feeders such as is here contemplated, the two elements of each coupling member being stamped out automatically and automatically folded and welded together with connecting pieces or portions therebetween;

To provide a joint or coupling member of the character referred to, to the opposite sides of which are connected the ends of two rods or links, with means on the inner sides of each of said disc-like elements of the coupling member to form a bearing which will permit universal movement of the coupling member relative to its connected rod or link;

To provide in connection with a flexible conveyor of the character referred to a pulley or sheave for the turns to be made by the conveyor, with housing therefor, whereby to form a closed channel around said pulley or sheave in which said flexible conveyor moves and in which it moves the loose matter around said pulley or sheave on its course of travel, said pulley or sheave being provided with radial cuts or slits at intervals around its edges, whereby said coupling members can catch for the purpose of automatically starting a pulley or sheave should it stop for any reason;

Other objects and advantages of the invention will appear from the following more detailed description of one practical embodiment thereof, taken with the accompanying sheet of drawings, in which:

Figure 1 is a perspective view showing two turn blocks in planes at right angles to each other, connected with tubes and through which my flexible conveyor can move;

Figure 2 is an enlarged view of one of the turn blocks, with one side removed, and as it would be seen on the line 2—2 on Fig. 1, showing the turn pulley or sheave therein;

Figure 3 is an enlarged sectional view through a portion of Fig. 2, with the side in place thereon, as indicated by section line 3—3 on Fig. 2;

Figure 4 is a perspective view of one of my conveyor coupling members, with the connecting rods or links connected into its opposite sides;

Figure 5 is a sectional view through said member, taken on line 5—5, Fig. 4; and Figure 6 is a fragmentary perspective view of a coupling member in which the parts are detachably connected with screws, instead of being welded together, whereby to couple two ends of the conveyor with a separate joint.

Referring more in detail to the drawings, in Fig. 1 I have shown two turn blocks, designated 7, 7, one being in a horizontal plane, and the other in a vertical plane, and at right angles to each other.

Each turn block, as here shown, is composed of two parts, 7ª and 7ᵇ, made of wood and secured together by means of screws. In the meeting faces of said blocks there is formed a passageway or channel, as 8, which is round in cross section, as seen in Fig. 3, and through which my improved flexible conveyor moves, as indicated in Fig. 2.

In each turn block 7 is a pulley or sheave, as 9, having the usual peripheral groove, 9', and also having short radial cuts or slits, as 9", 9" in its edges. These short radial cuts or slits 9" serve, when the pulley 9 stops for any reason, to receive the advancing edge of the coupling member 12 moving thereon with the result that the wheel is started again. Said pulley or sheave is provided with suitable bearings, as at 10, in said turn block 7.

As indicated in Fig. 1, said turn blocks are connected by tubes or pipes, as 11, whereby to form a continuous passageway or channel from one block to another, as will be understood from the indication in Fig. 1.

An important part of this invention is the flexible conveyor which travels through the tubes or pipes, or troughs, all connected together to form a continuous course of travel, including the turn blocks, and around which said conveyor moves for conveying the feed or loose matter along said course of travel.

I have referred to the main body part of the conveyor as a coupling member, and to the connections between the coupling members as rods or links.

As seen in the perspective view in Fig. 4, and in section in Fig. 5, each member is made of two parts. Each part is made first as a disc with a hole through it, like a washer, and then the outer portions are bent to spaced parallel relationship, as 12, 12, with an intermediate connecting portion in each, designated 12', 12'. Two parts are then put together, as in Fig. 4, and spot welded, as at 13, at the opposite sides of said member, thus forming a conveyor coupling member of a spool-like form, in the conveyor, and each of which is in effect two discs, spaced apart and secured together, as shown. Two insert U-shaped pieces, as 14, are also put between said bent portions, as shown, thus making a strong coupling member for pushing or conveying loose matter along with it in the tube or trough, as the case may be.

In Fig. 6, I have shown two of the coupling members, 12, 12, secured together, as with screws S, whereby to be disconnected or to form a joint between ends of the conveyor, when the length thereof has been determined. The strain on said screws would be only what is required to hold the two parts together, the strain on the conveyor being axially or longitudinally on the conveyor.

The connecting rods or links are designated 15, 15, and in the present showing are made of two rivets, butt welded together, as at 16, thus providing double heads, as 17, 17, thereon.

Dished washer-like bearing members, as 18, 18, are placed on said rods or links, next to their heads, before they are welded, and these are held in place between the two parts of the coupling members, as illustrated, when they are put together and spot welded, thus providing a pivoted or universal joint between the opposite sides of each coupling member and the end of the rod or link connected therewith, as fully illustrated in Figs. 4 and 5.

Thus I have provided a flexible conveyor, designed to be used in automatic feeders for poultry and the like, with a construction which will operate through tubes or pipes, or trough sections, and also around turn blocks in any direction, vertically or horizontally, and while I have illustrated and described one practical and successful embodiment of the invention, I am aware that changes in the details of construction and arrangement thereof can be made without departing from the spirit thereof, and I do not, therefore, limit the invention to these details except as I may be limited by the hereto appended claims.

I claim:

1. The combination with a tubular conduit to carry loose matter therethrough, of a conveyor operable in said conduit and having a coupling member for moving said matter in said conduit, said coupling member being formed of two disc-like elements with open centers, as are washers, and having their outer portions bent to spaced parallel relationships with intermediate connecting portions therebetween, said intermediate portions of two elements being secured flatwise together as a unit and forming a disc-like conveyor member, and connecting links pivotally connected at their ends with said conveyor members for moving matter by said conveyor member through said conduit.

2. A conveyor as set forth in claim 1 provided with two concaved washer bearing elements on the ends of said connecting links and operable within said disc-like conveyor member and said connecting links having head portions to seat in said concaved washer bearing elements, to form a universal bearing for the connected end of each connecting link.

3. The combination with a conduit for moving loose material therethrough, said conduit including turn blocks with sheaves therein, said sheaves having radial slits formed in the edges of the rims of said sheaves, of a flexible conveyor for moving loose material through said conduit and said turn blocks, said conveyor having conveyor coupling members connected at intervals along said conveyor, said conveyor coupling members each consisting of two disc-like members connected rigidly together at a space apart and forming a spool-like member having two point bearing on the floor of said conduit and being of a diameter corresponding to the inside of said conduit, whereby to push loose material through said conduit, the disc-like ends of said coupling members being adapted to engage in said radial slits in the edges of the rims of said sheaves when said sheaves stop for any reason and the load on said coupling members is increased, whereby to give a push to start said sheave.

References Cited in the file of this patent

UNITED STATES PATENTS

| | | |
|---|---|---|
| 499,525 | Dodge | June 13, 1893 |
| 499,527 | Dodge | June 13, 1893 |
| 1,117,939 | Zublin | Nov. 17, 1914 |
| 2,081,956 | Reimann | June 1, 1937 |
| 2,095,315 | Crocker | Oct. 12, 1937 |
| 2,125,897 | Michot-Dupont | Aug. 9, 1938 |
| 2,383,932 | Brunner | Sept. 4, 1945 |
| 2,645,331 | Bohman | July 14, 1953 |

FOREIGN PATENTS

| | | |
|---|---|---|
| 73,734 | Austria | Sept. 10, 1917 |